Patented Sept. 1, 1953

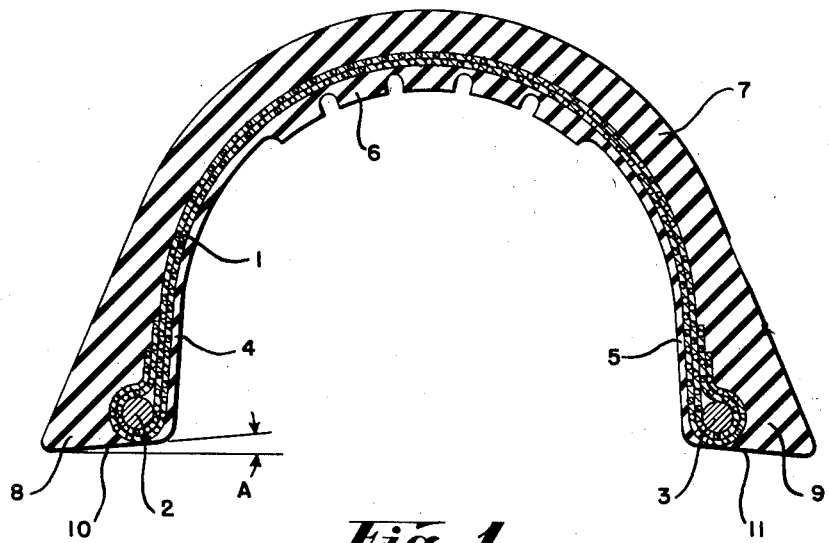
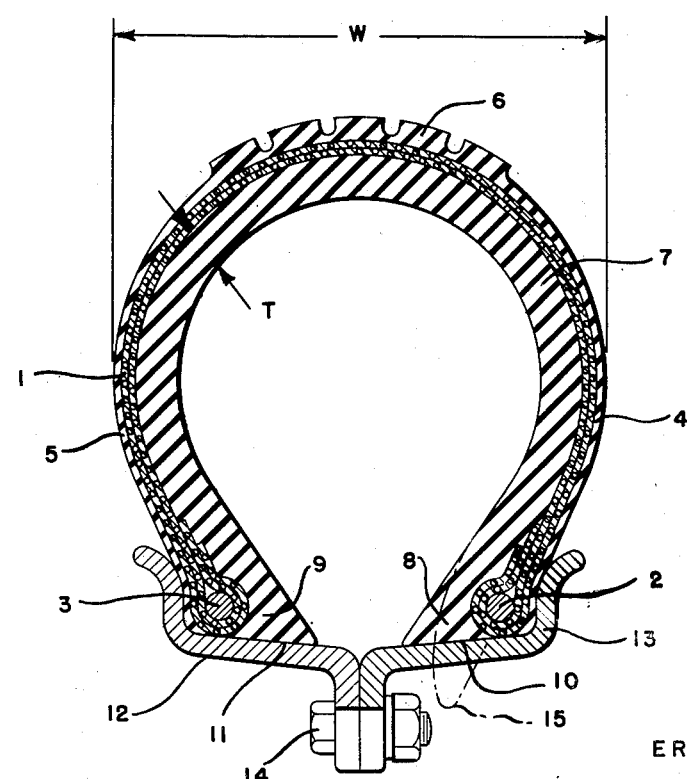

2,650,633

UNITED STATES PATENT OFFICE 2,650,633

RESILIENT TIRE

Ernst Eger, Los Angeles, Calif., assignor to United States Rubber Company, New York, N. Y., a corporation of New Jersey Application January 26, 1949, Serial No. 72,891

1 Claim. (Cl. 152—327)

This invention relates to resilient tires and, in particular, it relates to a tire in which rubber under compression is utilized as the medium for resiliently sustaining a load.

In certain uses for tires, it is desirable that the tire does not depend upon air pressure to sustain the tire load. For example, in the case of wheel barrows, supporting wheels for conveyors and for other slow moving vehicles, it is desirable to avoid the necessity of frequent inflation such as required by pneumatic tires.

In general, my invention comprises a tire formed of plies of strain resisting elements, bead wires, a tread portion and a relatively thick layer of soft rubber composition adjacent to the inner surface of the inner ply. Such a tire assembly is vulcanized in an inverted position with the tread on the inside. Thereafter the tire is reversed with the result that the layer of soft rubber composition is placed in a state of compression, and it is this compression which functions to sustain the tire load.

One of the principal features of my invention is the position of the thick layer of soft rubber composition at its terminating edges adjacent to the tire beads. I have found that when a tire of my invention is mounted on a rim, it is essential that the layer of rubber composition adjacent to the tire beads should likewise compress against the rim on which the tire is assembled. This is desirable in order to maintain proper stability of the tire and to prevent loss of compression stresses due to unconfined terminating edges of the soft rubber layer.

It is, therefore, among the objects of my invention to provide a tire capable of withstanding loads in the absence of internal air pressure; to provide such a tire and rim combination in which the compression medium of the tire is confined by the rim in a manner to increase such compression; to provide such a compression type tire having a high degree of stability and, in particular, lateral stability; and to provide such a tire which may be manufactured efficiently and economically.

These and other objects and advantages will appear more fully in the following detailed description when considered in connection with the accompanying drawing in which:

Fig. 1 is a transverse view, in section, of a tire forming an embodiment of my invention and illustrating the tire in its free vulcanized state; and Fig. 2 is a transverse view, in section, of the tire in an inverted position in assembly with a rim.

With reference to the drawings and, in particular, to Fig. 1, I show, in cross section, a tire forming an embodiment of my invention and comprising a carcass 1 formed of plies of strain resisting elements anchored to bead wires 2 and 3. Also bonded to the carcass 1 are tire side wall portions 4 and 5 and a tread 6. On the opposite side of the carcass is a layer 7 of rubber composition. This layer of rubber composition 7 covers the entire outer surface of the tire as shown in Fig. 1 and terminates with rim portions 8 and 9.

The carcass 1 is formed of two or more plies of fabric in accordance with conventional practice in the manufacture of pneumatic tires. That is, these plies consist of parallel cords positioned in diagonal relationship relative to the circumferential center line of the tire. Cords may be formed of cotton, rayon, nylon or wire. In each case the cords are treated for bonding with the rubber. Cords in adjacent plies extend in opposite diagonal relationship.

The edges of the plies of the carcass 1 are looped around the bead wires 2 and 3 so as to be anchored securely thereto. These bead wires 2 and 3 may be formed of single strands of substantially inextensible material such as steel joined together to form a complete annulus, or the bead wires may be formed with a plurality of strands of wire looped together in continuous convolutions to constitute a tire bead. The tread 6 in the side wall portions 4 and 5 are formed of rubber composition such as is conventional in the manufacture of pneumatic tires. While reference is made to a rubber composition, it is to be understood that it is intended to include natural rubber or synthetic rubber or combinations thereof.

The outer layer of rubber composition 7 is intended to constitute the compression medium for sustaining the load on the tire. It is, therefore, relatively thick and also relatively soft. For the desired performance of the tire of my invention, I find that the rubber composition 7 should preferably have a hardness of 45 durometer. However, good results can be obtained by maintaining this hardness in the order of from 40 to 55 durometer. The thickness of this rubber composition is also critical. This thickness, as shown in Fig. 2, is such that the character T is equal to from 6% to 10% of the cross sectional width of the tire as designated by the reference character W. Another feature of the invention is that the layer 7 is tapered so as to constitute a heavier thickness in the bead portions of the tire, than at the remaining portions of the tire. Also the regions 8 and 9 of the layer 7 lying adjacent to the beads 2 and 3 respectively extend laterally below the beads. The rim surfaces 10 and 11 of the layer 7 are not parallel with the axis of the tire, but are tapered at an angle of approximately 5°. This is indicated by the angle designation A.

The tire, as shown in Fig. 1, is built up and assembled substantially as shown. It is also vulcanized in this position so that the complete tire in its relaxed state appears generally U-shaped in cross section as shown in Fig. 1.

Fig. 2 illustrates the tire of Fig. 1 inverted and mounted on a rim. In this case, the rim consists of two rim halves 12 and 13 assembled together by bolts 14. When the tire is so inverted, the rubber layer 7 is in effect confined within smaller limits, thus setting up compression forces in the rubber layer 7 sufficient to sustain tire loads. When the tire is inverted, the portions 8 and 9 would normally extend below the rim, as shown by the dot and dash line 15. During the assembly operation, this projecting portion 15 is forced inwardly of the tire so as to engage the surface of the rim. In this way, the portions 8 and 9 of the layer 7 extend radially inwardly from the bead wires and are so positioned that a counter-force is exerted against the remaining portion of the stock so as to obtain increased compression stresses resulting in a better balanced tire. More important, it increases the stability of the tire particularly at the side wall portions.

Considerable tests have demonstrated that a tire in accordance with my invention will operate on slow moving vehicles comparatively with pneumatic tires. While I have shown a preferred embodiment of my invention, it is to be understood that it is susceptible of reasonable modifications as appearing within the spirit of the invention and in the scope of the appended claim.

Having thus described my invention, what I claim and desire to protect by Letters Patent is:

A tire having a generally U-shaped cross-sectional form in its unmounted and relaxed state, and comprised of an internal carcass of plies of stranded strain-resisting elements, inextensible bead members anchored within the terminal ends of the carcass, a rubber tread and sidewall portion extending across the carcass on the inner surface of said U, and a load-supporting layer of soft rubber extending across the carcass on the outer surface of said U, said load-supporting layer being sufficiently thick throughout its length to resiliently sustain the tire against collapse under the normal load for which the tire is intended, without any pneumatic pressure within the tire, when the tire is reversed into an inverted U-shape for mounting on a wheel, the terminal ends of said load-supporting layer being provided with portions extending laterally below the beads radially inwardly of the tire when in the said reversed position.

ERNST EGER.

References Cited in the file of this patent

UNITED STATES PATENTS

| Number | Name | Date |
|---|---|---|
| 506,424 | Ducasble | Oct. 10, 1893 |
| 758,336 | Shilton et al. | Apr. 26, 1904 |
| 924,572 | Palmer | June 8, 1909 |
| 1,575,966 | Brittain | Mar. 9, 1926 |
| 1,661,462 | Broluska | Mar. 6, 1928 |
| 1,928,524 | Brunswick | Sept. 26, 1933 |
| 2,292,290 | Robins | Aug. 4, 1942 |
| 2,372,382 | Krusemark | Mar. 27, 1945 |
| 2,469,394 | Lord | May 10, 1949 |

FOREIGN PATENTS

| Number | Country | Date |
|---|---|---|
| 10,636 | Great Britain | 1906 |
| 343,657 | France | 1904 |